United States Patent
He

(10) Patent No.: US 9,064,393 B2
(45) Date of Patent: Jun. 23, 2015

(54) VIDEO PLAYBACK METHOD, TERMINAL, AND SYSTEM

(71) Applicant: Huawei Technologies Co., Ltd., Shenzhen, Guangdong (CN)

(72) Inventor: Ronghui He, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 44 days.

(21) Appl. No.: 14/108,180

(22) Filed: Dec. 16, 2013

(65) Prior Publication Data
US 2014/0178033 A1    Jun. 26, 2014

Related U.S. Application Data

(63) Continuation of application No. PCT/CN2012/087391, filed on Dec. 25, 2012.

(51) Int. Cl.
| | |
|---|---|
| *H04N 9/80* | (2006.01) |
| *H04N 5/917* | (2006.01) |
| *G08B 13/196* | (2006.01) |
| *H04N 9/87* | (2006.01) |
| *G11B 27/34* | (2006.01) |

(52) U.S. Cl.
CPC .... *G08B 13/19669* (2013.01); *G08B 13/19656* (2013.01); *G08B 13/19671* (2013.01); *H04N 9/87* (2013.01); *G11B 27/34* (2013.01)

(58) Field of Classification Search
CPC .............. G08B 13/19669; G08B 13/19671; G08B 13/19656; H04N 9/87; G11B 27/10
USPC .......... 386/241, 353, 355, 356, 351, 323, 343
See application file for complete search history.

(56) References Cited

U.S. PATENT DOCUMENTS

| | | | |
|---|---|---|---|
| 2007/0201815 A1* | 8/2007 | Griffin | ............................. 386/52 |
| 2009/0237562 A1 | 9/2009 | Fujiwara et al. | |

FOREIGN PATENT DOCUMENTS

| | | |
|---|---|---|
| CN | 1901642 A | 1/2007 |
| CN | 101365117 A | 2/2009 |
| CN | 101540858 A | 9/2009 |

* cited by examiner

*Primary Examiner* — Robert Chevalier
(74) *Attorney, Agent, or Firm* — Leydig, Voit & Mayer, Ltd.

(57) ABSTRACT

The present disclosure discloses a video playback method, apparatus, and system. The method includes: dividing an original playback image into at least two regions of interest; determining, among the at least two regions of interest, a first region of interest where a triggering event occurs; obtaining decoded data of a first video image displayed in the first region of interest; and rendering the decoded data of the first video image to a specified playback window for playing. Using the video playback method, apparatus, and system according to embodiments of the present disclosure, an original playback image is divided into multiple regions of interest, and an image in a region of interest where a triggering event occurs is displayed separately.

15 Claims, 13 Drawing Sheets

140

VIDEO PLAYBACK METHOD, TERMINAL, AND SYSTEM

CROSS-REFERENCE TO RELATED APPLICATIONS

This application is a continuation of International Patent Application No. PCT/CN2012/087391, filed on Dec. 25, 2012, which is hereby incorporated by reference in its entirety.

TECHNICAL FIELD

The present disclosure relates to the field of video surveillance, and in particular, to video playback methods, terminals, and systems in the field of video surveillance.

BACKGROUND

Currently, high definition videos have become an important technical trend in the field of video surveillance, and cameras with resolution of 720p or 1080p are more and more widely applied in the field of video surveillance. With a continuous increase in camera resolution, the range that a single camera is capable of monitoring is increasingly wide, and image details are clearer; at the same time, an intelligent analysis technology for video images is gradually put into practice. With technical development of hardware devices, hardware performance has been capable of meeting requirements for performing intelligent analysis on multiple regions of interest in a same image, which significantly saves costs as compared with manual surveillance.

An existing video surveillance client generally plays video images from multiple cameras at the same time. However, with an increase in the resolution of video images, total resolution of video images from multiple cameras is often beyond the resolution range of a client's monitor. Taking a 22-inch display as an example, the display generally supports maximum resolution of 1920*1080, that is, the display is only allowed to play 1080p images from one feed. If multiple feeds of 1080p images are played on the monitor at the same time, the images have to be zoomed out. In addition to a playback window, there are also multiple auxiliary function panels on an interface of a typical video surveillance client, such as a title bar, a camera list, and a pan-tilt-zoom control panel, which further reduce a display area of video images. Therefore, images that can be played in the playback window are far smaller than original images.

Especially, when an event (for example, an event triggered by intelligent analysis) occurs in a video image, the region of the image where the event occurs is even smaller because the image is downsized during playback, which makes it inconvenient for a user to view. If observation personnel monitor images with naked eyes, it is hard for the observation personnel to notice the change of details, resulting in missing of key information.

Currently, most of the clients provide a function of zooming in a selected region of an image. That is, a region of a video playback image is selected by sliding a mouse, and the selected region is zoomed in, thereby improving image quality of the region of interest to a certain extent. However, digital zooming of the video image causes loss of some pixel information, therefore affecting the image quality and also affecting the effect of user observation on image details. In addition, if the function of zooming in a selected region is used, in one aspect, a manual operation by the user is needed, and the user may have no time to perform any operation when an event occurs suddenly, and therefore miss the event; in another aspect, if an event occurs in different regions of the image, it is impossible to zoom in several regions at the same time. Therefore, user experience is relatively poor.

SUMMARY

Embodiments of the present disclosure provide video playback methods, terminals, and systems, which are capable of improving user experience.

In a first aspect, an embodiment of the present disclosure provides a video playback method, where the method includes: dividing an original playback image into at least two regions of interest; determining, among the at least two regions of interest, a first region of interest where a triggering event occurs; obtaining decoded data of a first video image displayed in the first region of interest; and rendering the decoded data of the first video image to a specified playback window for playing.

In a first possible implementation manner of the first aspect, the method further includes: determining correspondence between each region of interest among the at least two regions of interest and a specified playback window; the rendering the decoded data of the first video image to a specified playback window for playing includes: according to the correspondence, rendering the decoded data of the first video image to a specified playback window corresponding to the first region of interest for playing.

With reference to the first aspect or the first possible implementation manner of the first aspect, in a second possible implementation manner of the first aspect, the determining, among the at least two regions of interest, a first region of interest where a triggering event occurs includes: determining a triggering operation performed by a user on a region of interest in the original playback image, where the triggering operation includes: a click operation, a double-click operation, or an operation of selecting a region of interest; and determining the region of interest within which the triggering operation is performed as the first region of interest.

With reference to the first aspect or the first possible implementation manner of the first aspect, in a third possible implementation manner of the first aspect, the determining, among the at least two regions of interest, a first region of interest where a triggering event occurs includes: obtaining coordinate metadata of a triggering event occurrence point in the original playback image; and determining the region of interest to which the triggering event occurrence point belongs as the first region of interest according to the coordinate metadata.

With reference to the first aspect or any one of the first to third possible implementation manners of the first aspect, in a fourth possible implementation manner of the first aspect, the obtaining decoded data of a first video image displayed in the first region of interest includes: obtaining decoded data of the original playback image; and determining the decoded data of the first video image according to the decoded data of the original playback image.

With reference to the first aspect or any one of the first to fourth possible implementation manners of the first aspect, in a fifth possible implementation manner of the first aspect, the rendering the decoded data of the first video image to a specified playback window for playing includes: rendering the decoded data of the first video image to the specified playback window for playing in a zoom-in manner, where the specified playback window is larger than the first region of interest.

With reference to the first aspect or any one of the first to fifth possible implementation manners of the first aspect, in a sixth possible implementation manner of the first aspect, the rendering the decoded data of the first video image to a specified playback window for playing includes: popping up an independent playback window; and rendering the decoded data of the first video image to the independent playback window for playing.

In a second aspect, an embodiment of the present disclosure provides a video playback terminal, where the terminal includes: a dividing module, configured to divide an original playback image into at least two regions of interest; a first determining module, configured to determine, among the at least two regions of interest marked out by the dividing module, a first region of interest where a triggering event occurs; an obtaining module, configured to obtain decoded data of a first video image displayed in the first region of interest determined by the first determining module; and a playback module, configured to render the decoded data of the first video image obtained by the obtaining module to a specified playback window for playing.

In a first possible implementation manner of the second aspect, the terminal further includes: a second determining module, configured to determine correspondence between each region of interest among the at least two regions of interest and a specified playback window, where the playback module is further configured to: according to the correspondence determined by the second determining module, render the decoded data of the first video image obtained by the obtaining module to a specified playback window corresponding to the first region of interest for playing.

With reference to the second aspect or the first possible implementation manner of the second aspect, in a second possible implementation manner of the second aspect, the first determining module includes: a first determining unit, configured to determine a triggering operation performed by a user on a region of interest in the original playback image, where the triggering operation includes: a click operation, a double-click operation, or an operation of selecting a region of interest; and a second determining unit, configured to determine the region of interest within which the triggering operation determined by the first determining unit is performed as the first region of interest.

With reference to the second aspect or the first possible implementation manner of the second aspect, in a third possible implementation manner of the second aspect, the first determining module includes: a first obtaining unit, configured to obtain coordinate metadata of a triggering event occurrence point in the original playback image; and a third determining unit, configured to: determine the region of interest to which the triggering event occurrence point belongs as the first region of interest according to the coordinate metadata obtained by the first obtaining unit.

With reference to the second aspect or any one of the first to third possible implementation manners of the second aspect, in a fourth possible implementation manner of the second aspect, the obtaining module includes: a second obtaining unit, configured to obtain decoded data of the original playback image; and a third determining unit, configured to determine the decoded data of the first video image according to the decoded data of the original playback image obtained by the second obtaining unit.

With reference to the second aspect or any one of the first to fourth possible implementation manners of the second aspect, in a fifth possible implementation manner of the second aspect, the playback module is further configured to render the decoded data of the first video image to the specified playback window for playing in a zoom-in manner, where the specified playback window is larger than the first region of interest.

With reference to the second aspect or any one of the first to fifth possible implementation manners of the second aspect, in a sixth possible implementation manner of the second aspect, the playback module includes: a display unit, configured to display an independent playback window; and a playback unit, configured to render the decoded data of the first video image to the independent playback window popped up by the display unit for playing.

In a third aspect, an embodiment of the present disclosure provides a video playback system, where the system includes: a terminal according to the second aspect of the present disclosure; a video capturing system, configured to capture a video image, and generate a media stream by encoding the video image; a server, configured to obtain the media stream generated by the video capturing system, and provide the media stream for the terminal; and a storage device, configured to store the media stream obtained by the server; where the terminal includes: a dividing module, configured to divide an original playback image into at least two regions of interest; a first determining module, configured to determine, among the at least two regions of interest marked out by the dividing module, a first region of interest where a triggering event occurs; an obtaining module, configured to obtain decoded data of a first video image displayed in the first region of interest determined by the first determining module; and a playback module, configured to render the decoded data of the first video image obtained by the obtaining module to a specified playback window for playing.

Based on the foregoing technical solutions, using the video playback method, terminal, and system according to the embodiments of the present disclosure, an original playback image is divided into multiple regions of interest, and an image in a region of interest where a triggering event occurs is displayed separately. Therefore, in one aspect, a user is capable of observing clearer image details in the region of interest, and in another aspect, the user is capable of tracking image details in the multiple regions of interest at the same time, thereby significantly improving user experience.

BRIEF DESCRIPTION OF DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 1:
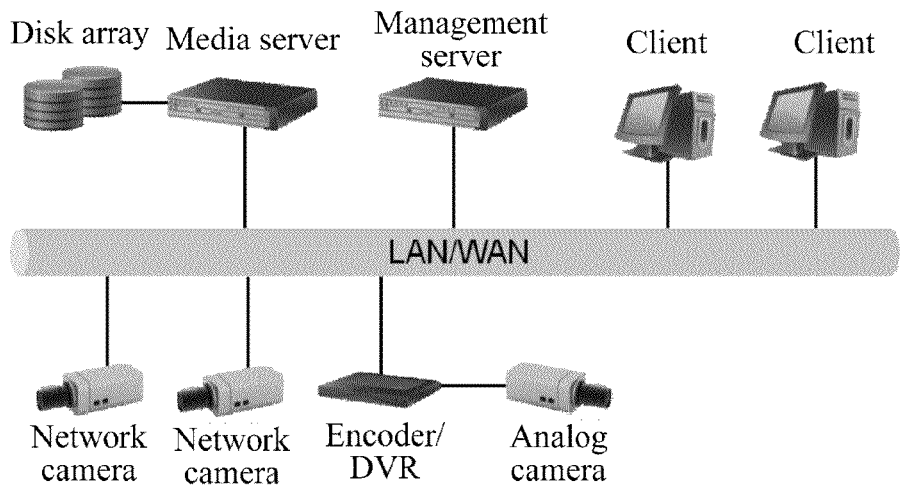
FIG. 1 is a schematic architectural diagram of an exemplary application scenario according to an embodiment of the present disclosure.

FIG. 1 is a schematic architectural diagram of an exemplary application scenario according to an embodiment of the present disclosure. As shown in FIG. 1, a video surveillance system where the embodiment of the present disclosure is applicable may include: a video capturing device, a central server, a storage device, and a terminal with a client, where the video capturing device may be used to capture a video image, and may generate a media stream by encoding the video image, so as to transmit the video image over a network. For example, the video capturing device may include devices such as a network camera, an analog camera, an encoder, and a digital video recorder (DVR for short). After being connected to the central server, the client of the terminal may request a video stream, decode and display the video stream, and present an onsite video image to a user.

The central server may include a management server and a media server, where the media server may be responsible for receiving the media stream, recording and saving data of the media stream in the storage device, and forwarding the media stream to the client for playing on demand; the management server may be responsible for functions such as user login, authentication, and service scheduling; the central server may also be accessed by multiple clients, manage network connections between various video surveillance systems, and so on. The storage device may be, for example, a disk array, and the disk array may be responsible for storing video data, and may use a network attached storage (NAS for short), a storage area network (SAN for short), or the server itself to store the video data.

It should be understood that, the video surveillance system shown in FIG. 1 is only an embodiment where the method of the present disclosure is applicable, but is not intended to limit the purposes and functions of the present disclosure. The present disclosure should not be explained as to be subject to any requirement related to any one of or any combination of components of the video surveillance system shown in FIG. 1. However, to elaborate on the present disclosure more clearly, the embodiments of the present disclosure are described below by taking an application scenario of the video surveillance system as an example, but the present disclosure is not limited thereto.

It should also be understood that, a technical solution for video data transmission in the embodiment of the present disclosure may use various communication networks or communication systems, for example, a Global System for Mobile Communications ("GSM" for short) system, a Code Division Multiple Access (Code Division Multiple Access, "CDMA" for short) system, a Wideband Code Division Multiple Access (Wideband Code Division Multiple Access, "WCDMA" for short) system, a general packet radio service ("GPRS" for short) system, a Long Term Evolution ("LTE" for short) system, an LTE frequency division duplex ("FDD" for short) system, an LTE time division duplex ("TDD" for short) system, a Universal Mobile Telecommunication System ("UMTS" for short), or a Worldwide Interoperability for Microwave Access ("WiMAX" for short) communication system. The embodiment of the present disclosure is not limited thereto.

Figure 2:
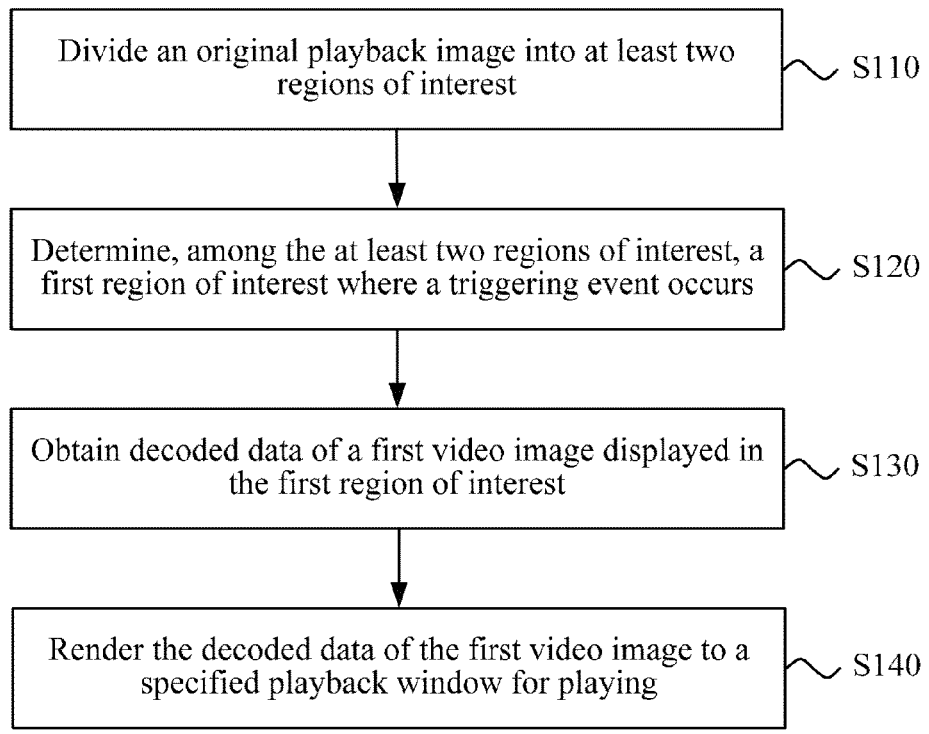
FIG. 2 is a schematic flow chart of a video playback method according to an embodiment of the present disclosure.

FIG. 2 is a schematic flow chart of a video playback method 100 according to an embodiment of the present disclosure. The method 100 may be executed by a video playback apparatus, where the apparatus is, for example, a terminal or a client. As shown in FIG. 2, the method 100 includes the following steps:

S110: Divide an original playback image into at least two regions of interest.

S120: Determine, among the at least two regions of interest, a first region of interest where a triggering event occurs.

S130: Obtain decoded data of a first video image displayed in the first region of interest.

S140: Render the decoded data of the first video image to a specified playback window for playing.

In order not to affect image quality of a playback video, and to improve the effect of user observation on image details, especially in a case where multiple video images are displayed in a same window in a zoom-out manner, the video playback apparatus may first divide the original playback image into the multiple regions of interest and obtain the decoded data of the video image displayed in the region of interest where the triggering event occurs; therefore, the video playback apparatus may render the decoded data of the video image to the independent specified playback window for playing. In this way, the image details in which a user is interested may be displayed in the independent window, and the effect of user observation on image details is improved.

Therefore, the video playback method according to the embodiment of the present disclosure divides an original playback image into multiple regions of interest, and separately displays an image in a region of interest where a triggering event occurs. Therefore, in one aspect, a user is capable of observing clearer image details in the region of interest, and in another aspect, the user is capable of tracking image details in the multiple regions of interest at the same time, thereby significantly improving user experience.

It should be understood that, in the embodiment of the present disclosure, the video not only includes a video file, but also includes a real-time video stream. The embodiment of the present disclosure is described by taking the playing of a real-time video stream as an example, but the embodiment of the present disclosure is not limited thereto.

Figure 3:
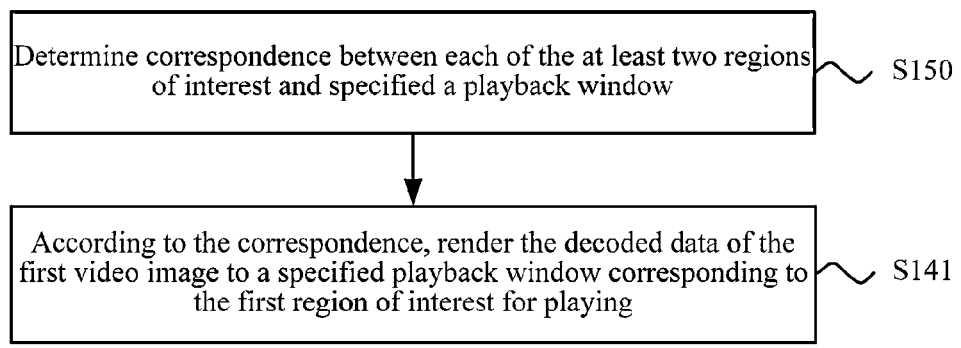
FIG. 3 is another schematic flow chart of a video playback method according to an embodiment of the present disclosure.

In the embodiment of the present disclosure, optionally, as shown in FIG. 3, the method 100 further includes the following steps:

S150: Determine correspondence between each region of interest among the at least two regions of interest and a specified playback window.

The rendering the decoded data of the first video image to a specified playback window for playing includes the following steps:

S141: According to the correspondence, render the decoded data of the first video image to a specified playback window corresponding to the first region of interest for playing.

That is, each region of interest may be associated with one or more playback windows, so as to play the image in the region of interest when a triggering event occurs in the region of interest. The specified window may be a maximum playback window on a display apparatus, and may also be a part of the maximum playback window; the specified window may be a currently existing playback window or a part of the existing playback window, and may also be a new pop-up playback window or a newly generated playback window. The embodiment of the present disclosure is not limited thereto.

With reference to FIG. 4 to FIG. 12B, the following describes in detail the video playback method according to an embodiment of the present disclosure.

In S110, optionally, the dividing an original playback image into at least two regions of interest includes: dividing the original playback image into the at least two regions of interest in an equal division manner or a free division manner.

Specifically, a single playback window may be divided into multiple regions of interest in advance on a client. Sizes of the regions of interest may be the same or different, and the regions of interest may be set as irregular regions; in addition, in the embodiment of the present disclosure, correspondence between the regions of interest and playback windows may be determined. The dividing an original playback image into regions of interest may be performed by a user manually, and may also be automatically configured through client software, and then the configuration is saved on the client.

Figure 4:
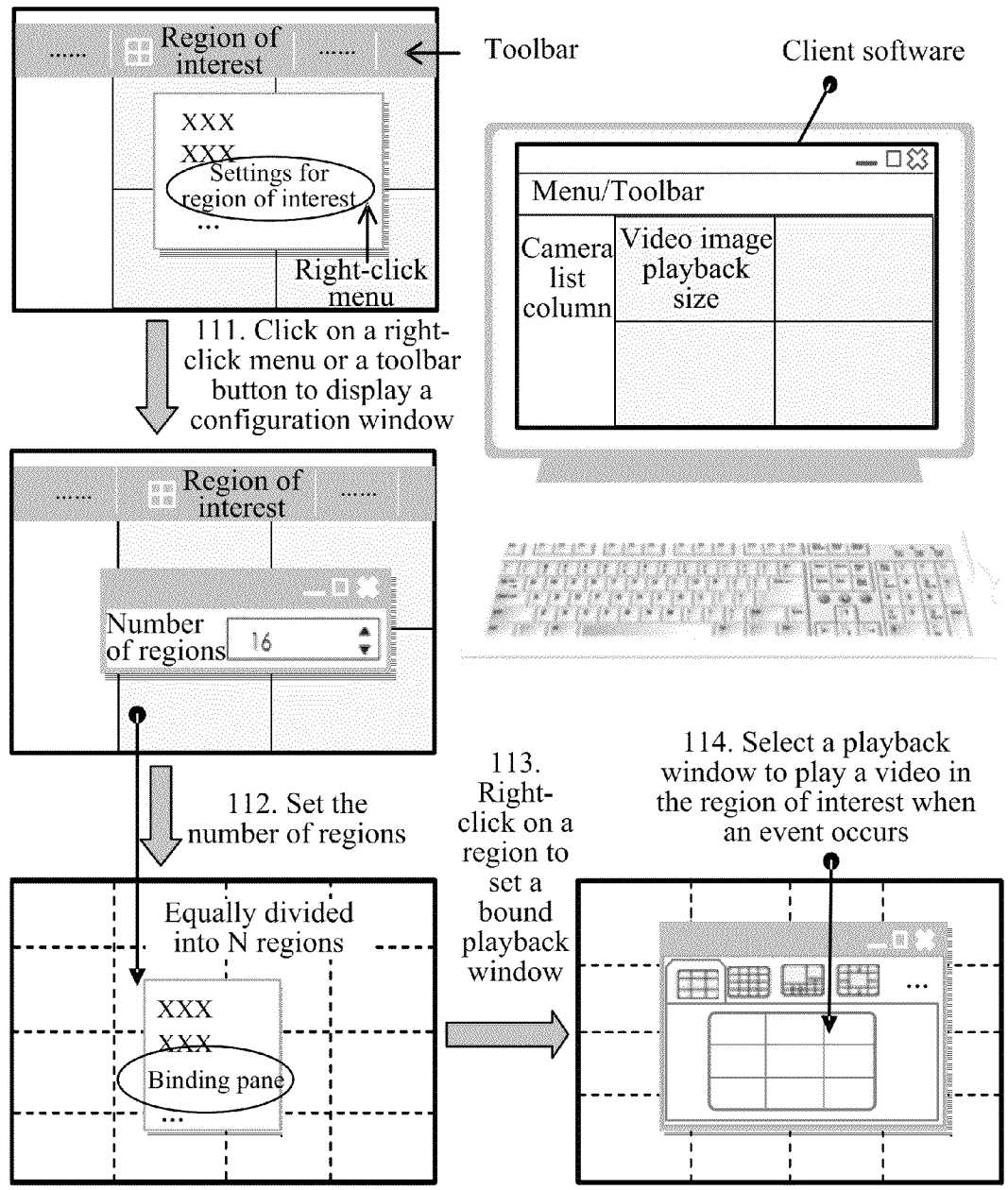
FIG. 4 is a schematic flow chart of a method for dividing an original playback image into regions of interest according to an embodiment of the present disclosure.
Figure 5:
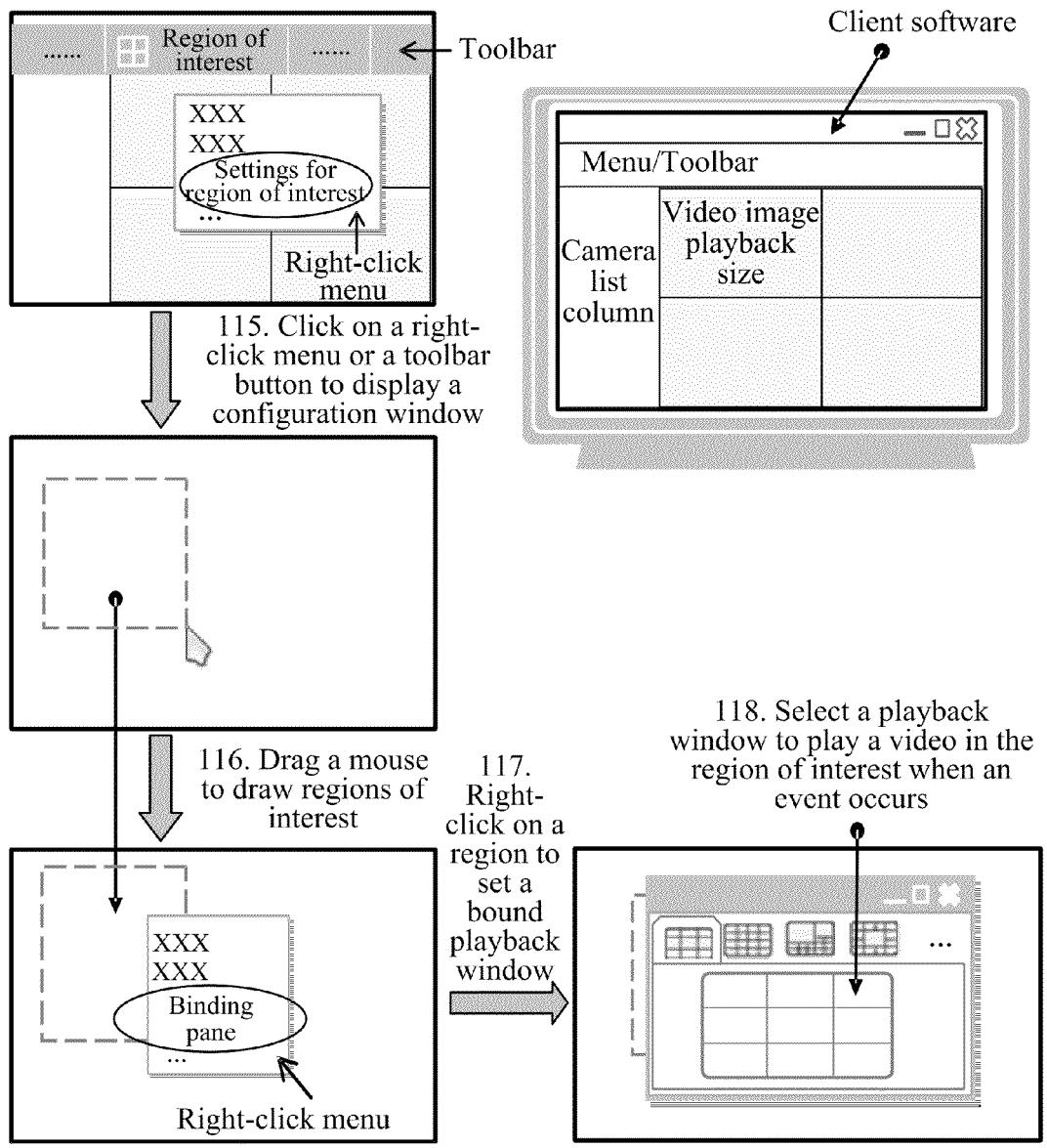
FIG. 5 is another schematic flow chart of a method for dividing an original playback image into regions of interest according to an embodiment of the present disclosure.

An image may be divided in an equal division manner or a free division manner. A specific configuration process is shown in FIG. 4 and FIG. 5. For example, as shown in FIG. 4, a method for dividing an image into regions of interest in an equal division manner includes the following steps:

S111: Click on a right-click menu or a toolbar button to display a configuration window.

S112: In the pop-up configuration window, set the number of regions of interest, for example, set the number of regions of interest to 16.

S113: Right-click on a region of interest to set a playback window bound to the region of interest.

S114: Select a playback window to play a video in the region of interest when a triggering event occurs in the region of interest.

As shown in FIG. 5, a method for dividing an image into regions of interest in a free division manner may include, for example, the following steps:

S115: Click on a right-click menu or a toolbar button to pop up a configuration window.

S116: In the pop-up configuration window, drag a mouse to draw regions of interest; where sizes and shapes of the regions of interest may be the same or different.

S117: Right-click on a region of interest to set a playback window bound to the region of interest.

S118: Select a playback window to play a video in the region of interest when a triggering event occurs in the region of interest.

It should be understood that, in the embodiment of the present disclosure, the original playback image that is divided into regions of interest may be all playback images in a maximum playback window on a display device, and may also be one or more images among multiple images played at the same time in the maximum playback window. The embodiment of the present disclosure is not limited thereto.

In S120, a video playback apparatus determines, among the at least two regions of interest, a first region of interest where a triggering event occurs, so as to display the image in the first region of interest in a separate playback window, thereby improving a display effect of image details.

In the embodiment of the present disclosure, a user may manually trigger an event and determine a region of interest, and may also detect an automatically generated trigger event and determine the region of interest, which are described in the following with reference to FIG. 6 and FIG. 7 respectively.

Figure 6:
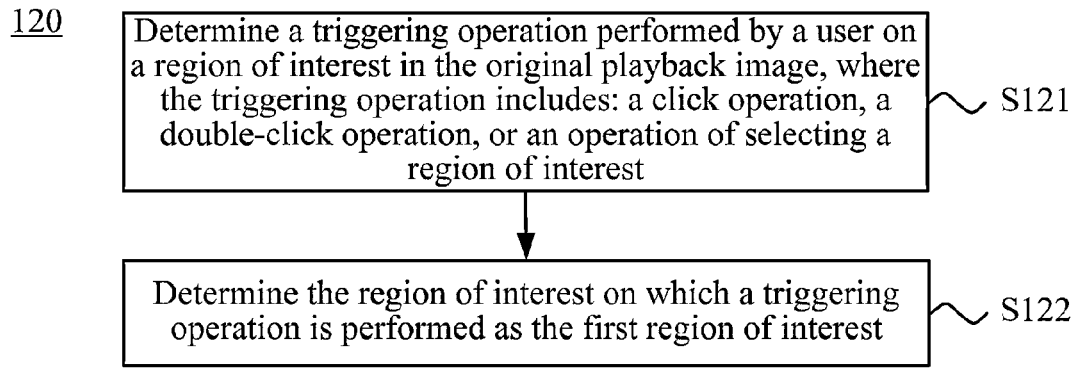
FIG. 6 is a schematic flow chart of a method for determining a region of interest where a triggering event occurs according to an embodiment of the present disclosure.

As shown in FIG. 6, optionally, the determining, among the at least two regions of interest, a first region of interest where a triggering event occurs includes:

S121: Determine a triggering operation performed by a user on a region of interest in the original playback image, where the triggering operation includes: a click operation, a double-click operation, or an operation of selecting a region of interest.

S122: Determine the region of interest on which the triggering operation is performed as the first region of interest.

Specifically, when a user views a video, if detecting that an event occurs, the user may operate on a client interface, for example, perform a triggering operation on a region of interest in the original playback image, so that an image in the region of interest where the event occurs is played in a pre-designated playback window, or displayed in an independent pop-up playback window; when events occur in multiple regions of interest, the user may trigger multiple windows for displaying. The triggering operation is, for example, a click operation, a double-click operation, or an operation of selecting a region of interest. The embodiment of the present disclosure is not limited thereto.

Figure 7:
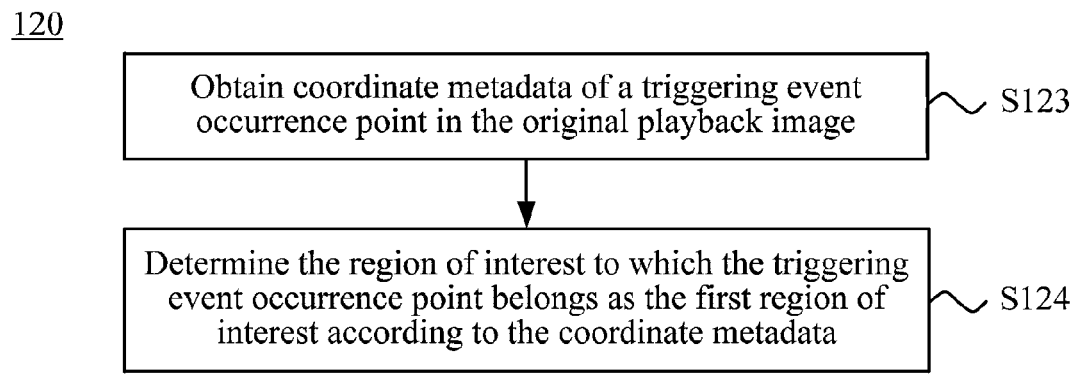
FIG. 7 is another schematic flow chart of a method for determining a region of interest where a triggering event occurs according to an embodiment of the present disclosure.

FIG. 7 shows another schematic flow chart of a method for determining a region of interest where a triggering event occurs according to an embodiment of the present disclosure. As shown in FIG. 7, optionally, the determining, among the at least two regions of interest, a first region of interest where a triggering event occurs includes:

S123: Obtain coordinate metadata of a triggering event occurrence point in the original playback image.

S124: Determine the region of interest to which the triggering event occurrence point belongs as the first region of interest according to the coordinate metadata.

Specifically, for example, a user may pre-configure a region that require automatic event detection, and configure an event detection rule, for example, motion detection or intelligent analysis detection. When an event occurs, client software may determine, according to coordinate metadata of a triggering event occurrence point, a corresponding region of interest configured in advance, so that a corresponding image is played in a pre-designated playback window, or displayed in an independent pop-up playback window; when events occur in multiple regions of interest, the client software may trigger multiple windows for displaying.

It should be understood that, in irregular intelligent analysis regions, the triggering event may cover multiple regions of interest, and at this time, the multiple regions of interest may be determined as the first region of interest where the triggering event occurs. The embodiment of the present disclosure is not limited thereto.

In the embodiment of the present disclosure, a video playback apparatus may determine whether a triggering event occurs in a region of interest by means of motion detection, intelligent analysis detection, or the like; a central server may also perform detection to determine whether a triggering event occurs in a region of interest, and when a triggering event is detected, the central server may feed back coordinate metadata of a triggering event occurrence point to the video playback apparatus, so that the video playback apparatus may determine the first region of interest where the triggering event occurs according to the coordinate metadata. The embodiment of the present disclosure is not limited thereto.

In S130, the video playback apparatus obtains decoded data of a first video image displayed in the first region of interest, so that the first video image is played in a specified playback window.

Figure 8:
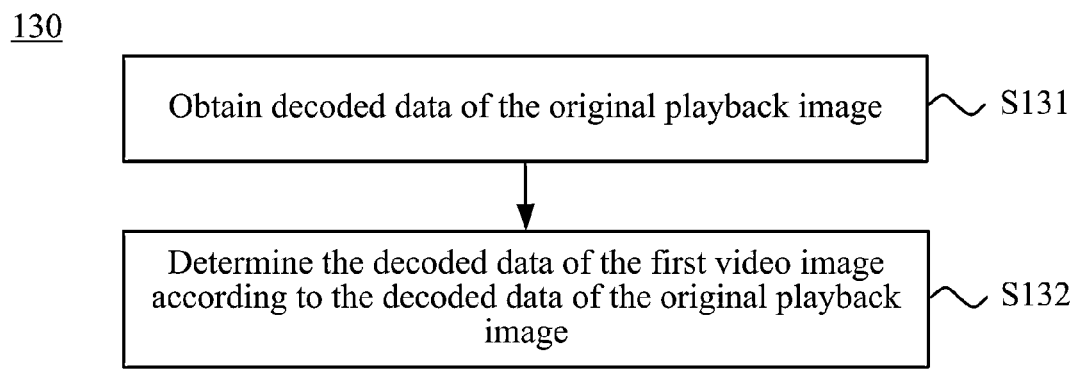
FIG. 8 is a schematic flow chart of a method for obtaining decoded data of a region of interest according to an embodiment of the present disclosure.

In the embodiment of the present disclosure, optionally, as shown in FIG. 8, the obtaining decoded data of a first video image displayed in the first region of interest includes the following steps:

S131: Obtain decoded data of the original playback image.

S132: Determine the decoded data of the first video image according to the decoded data of the original playback image.

Specifically, for example, the video playback apparatus receives an event manually triggered by a user, in a manner of a click, a double-click, a click on a toolbar button, or a shortcut key, the apparatus may intercept data content that belongs to the region of interest from decoded YUV data in an original playback window, and may play this part of the content in a pre-designated playback pane (or display an independent playback window to play this part) according to pre-configured correspondence. Multiple playback windows use the same YUV data source; therefore, the apparatus does not need to bring in or add extra multiple video streams.

For example, it is assumed that resolution of the original playback image is Width×Height; as for the region of interest, a horizontal coordinate of a start point is StartX, a vertical coordinate of the start point is StartY, a horizontal coordinate of an end point is EndX, and the vertical coordinate is of the end point is EndY. YUV data of the original playback image is in an array Org[Width×Height], and YUV data of the region of interest is in Dst[ROIWidth×ROIHeight], where n is any point in the region of interest; then the YUV data in the region of interest may be determined according to the following equations:

$$ROIWidth = EndX - StartX;$$

$$ROIHeight = EndY - StartY;$$

$$Dst[n] = Org[(Width \times (StartY + n/ROIWidth) + StartX + n \% ROIWidth)].$$

A division operation "/" indicates rounding down to the nearest integer, and a symbol "%" indicates an REM operation.

In S140, the video playback apparatus renders the decoded data of the first video image to a specified playback window for playing.

Specifically, the video playback apparatus may play the first video image in a pop-up window, or display the first video image in a new playback window, or display the first video image in the original playback window, and may perform digital zooming on the first video image to adapt to the size of the playback window. That is, in the embodiment of the present disclosure, the specified window may be a maximum playback window on a display apparatus, and may also be a part of the maximum playback window. The specified window may be a currently existing playback window or a part of the existing playback window, and may also be a new pop-up or a newly generated playback window; the specified window may be one window, and may also be more than one window. The embodiment of the present disclosure is not limited thereto.

In the embodiment of the present disclosure, optionally, the rendering the decoded data of the first video image to a specified playback window for playing includes:

rendering the decoded data of the first video image to the specified playback window for playing in a zoom-in manner, where the specified playback window is larger than the first region of interest.

Figure 9:
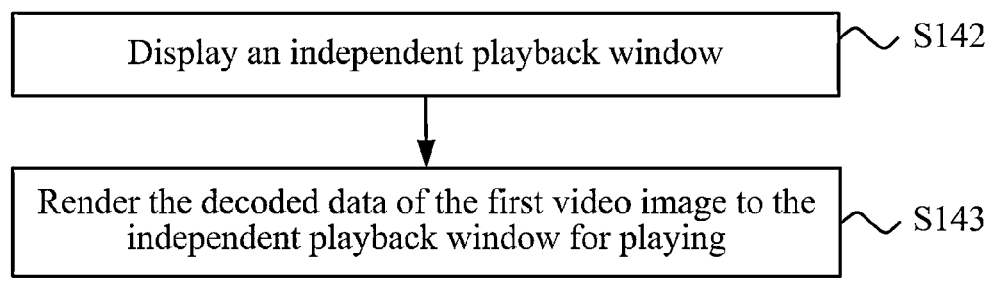
FIG. 9 is a schematic flow chart of a method for playing an image in a region of interest according to an embodiment of the present disclosure.

In the embodiment of the present disclosure, for example, as shown in FIG. 9, the rendering the decoded data of the first video image to a specified playback window for playing includes the following steps:

S142: Display an independent playback window.

S143: Render the decoded data of the first video image to the independent playback window for playing.

It should be understood that, in the embodiment of the present disclosure, the specified playback window is the independent pop-up playback window, and the independent pop-up playback window may be larger than the first region of interest, so that the first video image is played in a zoom-in manner, but the embodiment of the present disclosure is not limited thereto. For example, the independent playback window may be smaller than or equal to the first region of interest.

It should be understood that, in the embodiment of the present disclosure, "B corresponding to A" indicates that B is associated with A, and B may be determined according to A. However, it should also be understood that, determining B according to A does not mean that B is determined according to A only, but B may be determined according to A and/or other information.

It should be understood that, in the embodiments of the present disclosure, sequence numbers of the foregoing processes do not indicate an executing sequence. The executing sequence of the processes should be determined according to functions and intrinsic logic thereof, and should not constitute any limit on the implementation of the embodiments of the present disclosure.

Therefore, the video playback method according to the embodiment of the present disclosure divides an original playback image into multiple regions of interest, and separately displays an image in a region of interest where a triggering event occurs. Therefore, in one aspect, a user is capable of observing clearer image details in the region of interest, and in another aspect, the user is capable of tracking image details in the multiple regions of interest at the same time, thereby significantly improving user experience. In addition, the embodiment of the present disclosure uses original decoded data to play the image in the region of interest, which does not add extra video streams.

With reference to FIG. 10 to FIG. 12B, the following describes in detail video playback methods according to the embodiments of the present disclosure.

Figure 10:
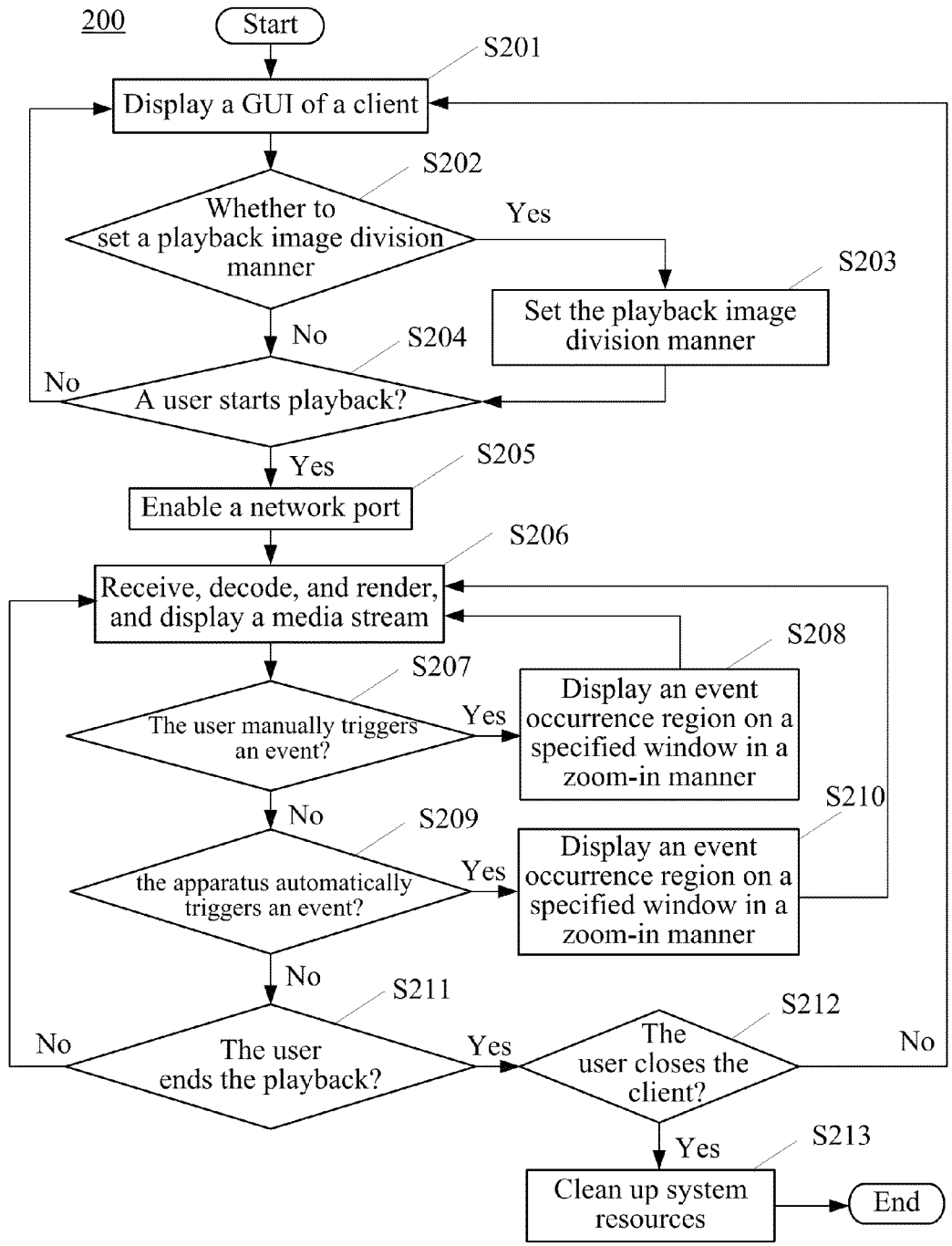
FIG. 10 is a schematic flow chart of a video playback method according to another embodiment of the present disclosure.

As shown in FIG. 10, a video playback method 200 may be executed by a video playback apparatus, and the apparatus is, for example, a terminal or a client. The method 200 may include the following steps:

S201: Display a graphical user interface (GUI for short) of a client.

S202: Determine whether to set a playback image division manner; if it is determined to set a playback image division manner, the process proceeds to S203; otherwise, the process proceeds to S204.

S203: Set the playback image division manner; and the process proceeds to S204.

S204: Determine whether a user starts playback; if it is determined that the user starts playback, the process proceeds to S205; otherwise, the process proceeds to S201.

S205: Enable a network port.

S206: Receive a media stream, and decode the media stream, to render the decoded media stream to a display apparatus for displaying.

S207: Determine whether the user manually triggers an event; if it is determined that the user manually triggers an event, the process proceeds to S208; otherwise, the process proceeds to S209.

S208: When determining that the user manually triggers an event, display an event occurrence region on a specified window in a zoom-in manner; and the process proceeds to S206.

S209: Determine whether the apparatus automatically triggers an event; if it is determined that the apparatus automatically triggers an event, the process proceeds to S210; otherwise, the process proceeds to S211.

S210: When determining that the apparatus automatically triggers an event, display an event occurrence region on a specified window in a zoom-in manner; and the process proceeds to S206.

S211: Determine whether the user ends the playback; if it is determined that the user ends the playback, the process proceeds to S212; otherwise, the process proceeds to S206.

S212: Determine whether the user closes the client; if it is determined that the user closes the client, the process proceeds to S213; otherwise, the process proceeds to S201.

S213: Clean up system resources; and the video playback ends.

It should be understood that, in the embodiments of the present disclosure, sequence numbers of the foregoing processes do not indicate an executing sequence. The executing sequence of the processes should be determined according to functions and intrinsic logic thereof, and should not constitute any limit on the implementation of the embodiments of the present disclosure.

Figure 11A:
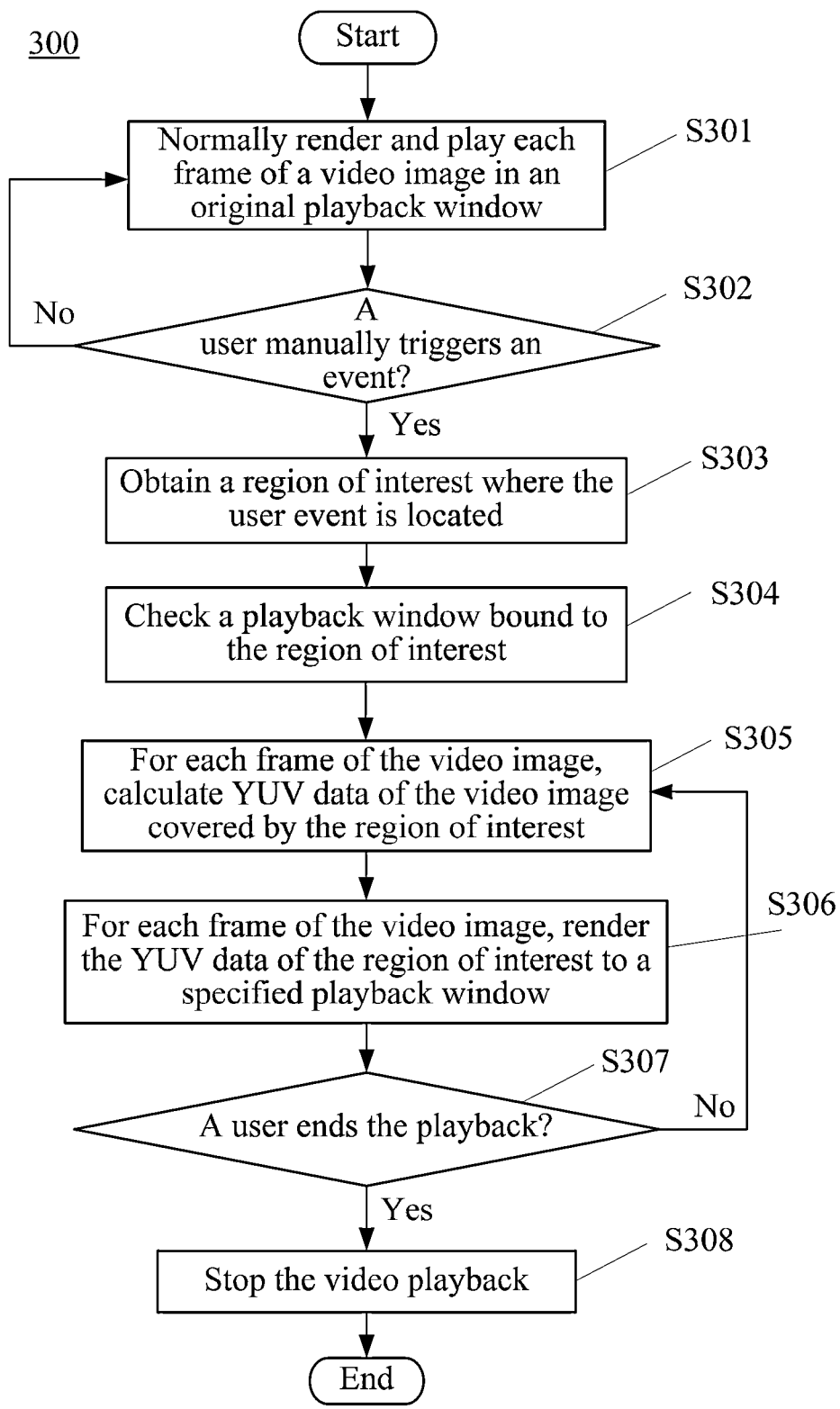
FIG. 11A and FIG. 11B are another two schematic flow charts of a video playback method according to another embodiment of the present disclosure.

FIG. 11A shows a schematic flow chart of a playback method 300 in which a region of interest is manually triggered according to an embodiment of the present disclosure. The method 300 may be executed by a video playback apparatus, and the apparatus is, for example, a terminal or a client. As shown in FIG. 11A, the method 300 may include the following steps:

S301: Normally render and play each frame of a video image in an original playback window.

S302: Determine whether a user manually triggers an event; if it is determined that the user manually triggers an event, the process proceeds to S303; otherwise, the process proceeds to S301.

S303: Obtain a region of interest where the user event is located.

S304: Check a playback window bound to the region of interest.

S305: For each frame of the video image, calculate YUV data of the video image covered by the region of interest.

Figure 12A:
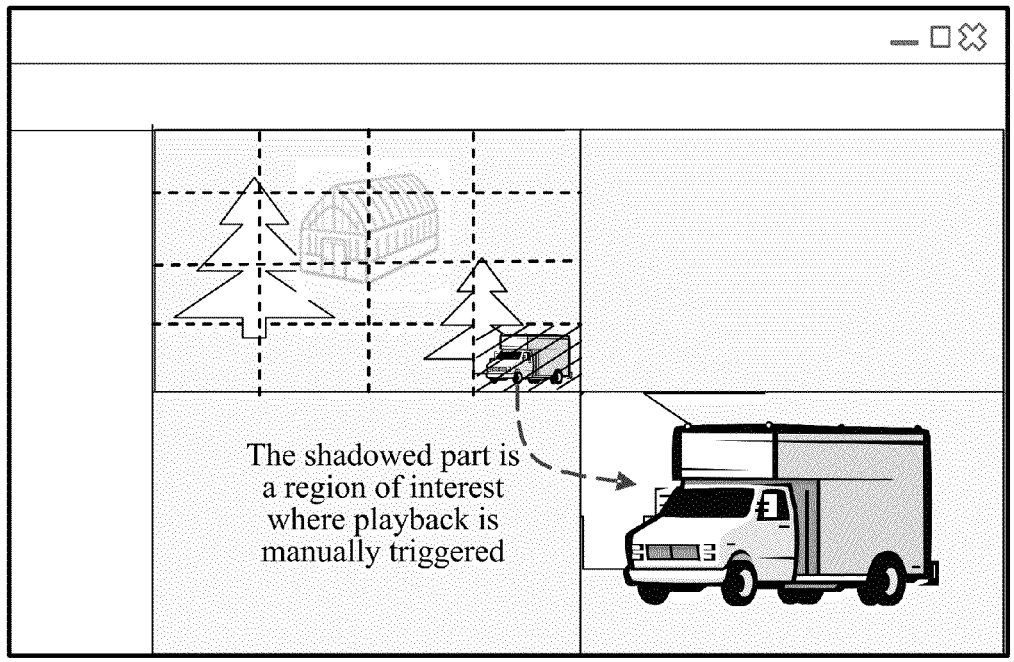
FIG. 12A and FIG. 12B are schematic diagrams of playing a region of interest according to an embodiment of the present disclosure.

S306: For each frame of the video image, render the YUV data of the region of interest to a specified playback window for playing; for example, as shown in FIG. 12A, the whole playback window includes an original playback image window and three specified playback windows with the same size as the original playback image window, where the original playback image is divided into 16 regions of interest, and an image in the region of interest where a manual triggering event occurs is played on one of the specified playback windows in a zoom-in manner.

S307: Determine whether the user ends the playback; if it is determined that the user ends the playback, the process proceeds to S308; otherwise, the process proceeds to S305.

S308: Stop the video playback; and the process ends.

Figure 11B:
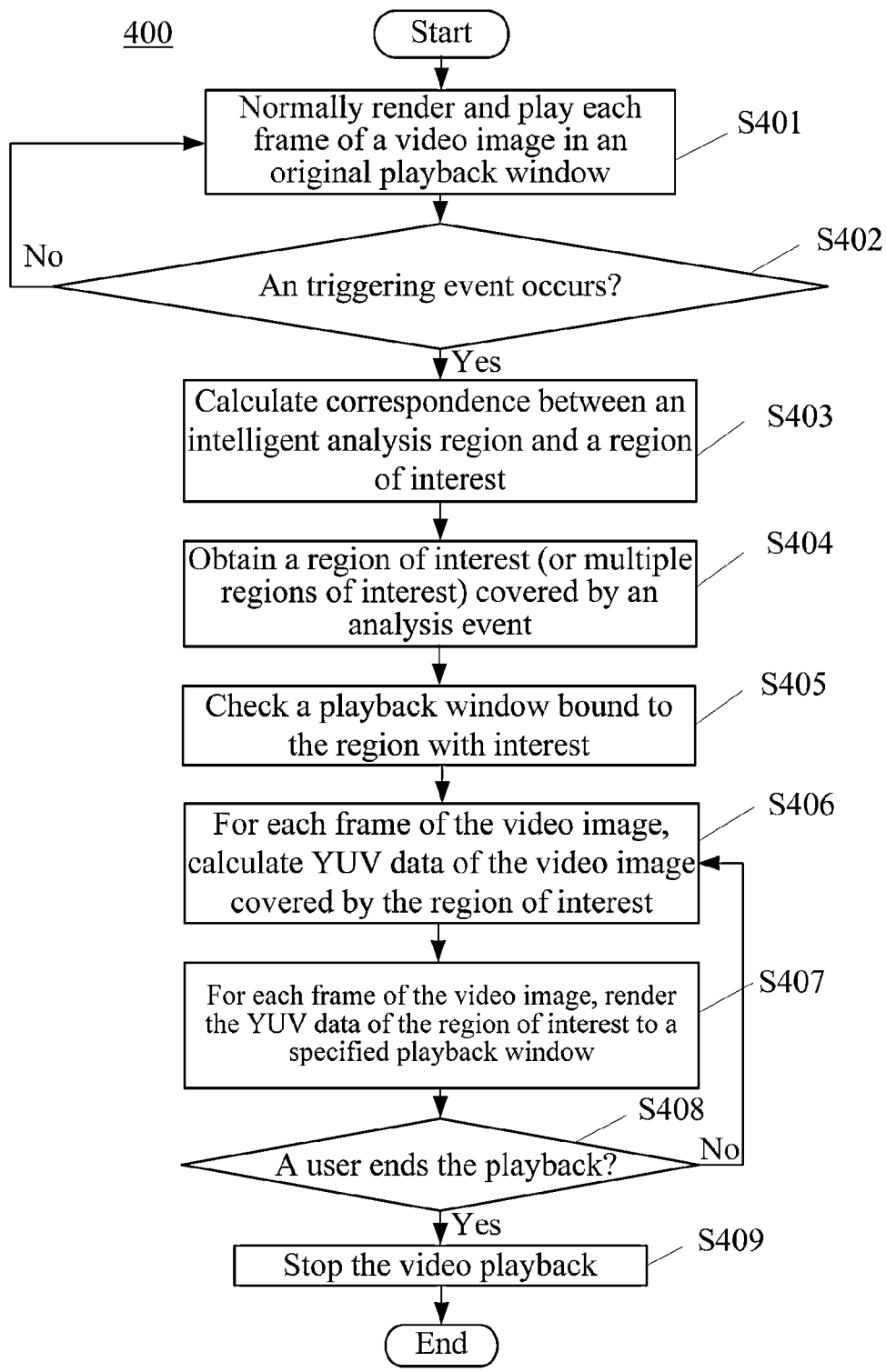

FIG. 11B is a schematic flow chart of a playback method 400 in which a region of interest is automatically triggered by an event according to an embodiment of the present disclosure. The method 400 may include the following steps:

S401: Normally render and play each frame of a video image in an original playback window.

S402: Perform intelligent analysis to determine whether a triggering event occurs; if it is determined that a triggering event occurs, the process proceeds to S403; otherwise, the process proceeds to S401.

S403: Calculate correspondence between an intelligent analysis region and a region of interest.

S404: Obtain a region of interest (or multiple regions of interest) covered by an analysis event.

S405: Check a playback window bound to the region of interest.

S406: For each frame of the video image, calculate YUV data of the video image covered by the region of interest.

Figure 12B:
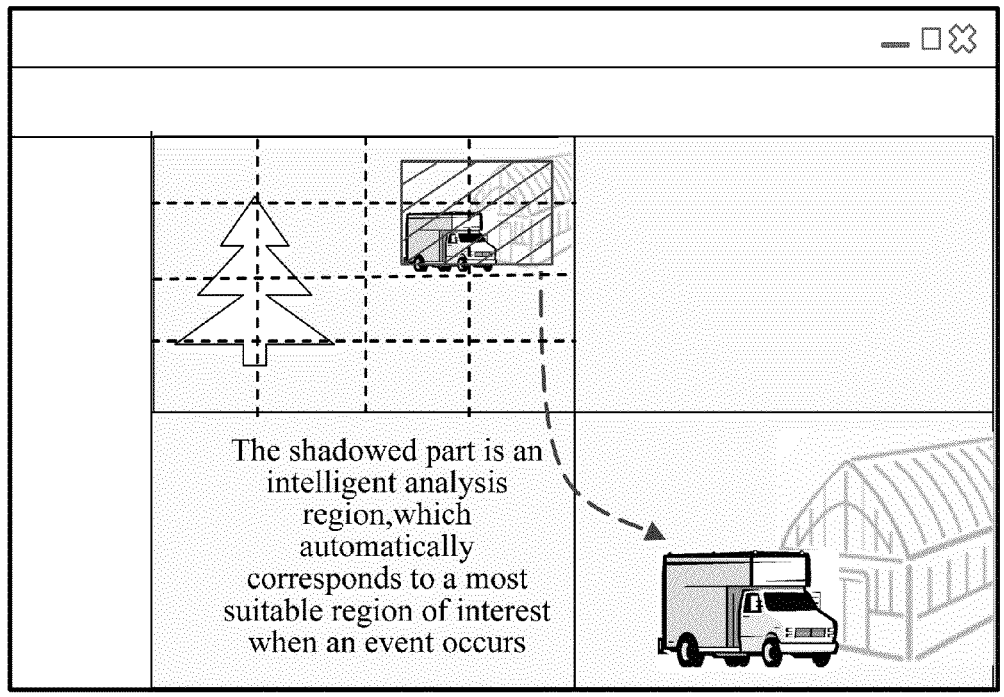

S407: For each frame of the video image, render the YUV data of the region of interest to a specified playback window for playing; for example, as shown in FIG. 12B, the whole playback window includes an original playback image window and three specified playback windows with the same size as the original playback image window, where the original playback image is divided into 16 regions of interest, and an image in the region of interest where a triggering event occurs is played on one of the specified playback windows in a zoom-in manner.

S408: Determine whether a user ends the playback; if it is determined that the user ends the playback, the process proceeds to S409; otherwise, the process proceeds to S406.

S409: Stop the video playback; and the process ends.

It should be understood that, in the embodiments of the present disclosure, sequence numbers of the foregoing processes do not indicate an executing sequence. The executing sequence of the processes should be determined according to functions and intrinsic logic thereof, and should not constitute any limit on the implementation of the embodiments of the present disclosure.

Therefore, the video playback method according to the embodiment of the present disclosure divides an original playback image into multiple regions of interest, and separately displays an image in a region of interest where a triggering event occurs. Therefore, in one aspect, a user is capable of observing clearer image details in the region of interest, and in another aspect, the user is capable of tracking image details in the multiple regions of interest at the same time, thereby significantly improving user experience.

With reference to FIG. 1 to FIG. 12B, the video playback methods according to the embodiments of the present disclosure is described in detail above. With reference to FIG. 13 to FIG. 20, the following describes in detail a video playback terminal and system according to the embodiments of the present disclosure.

Figure 13:
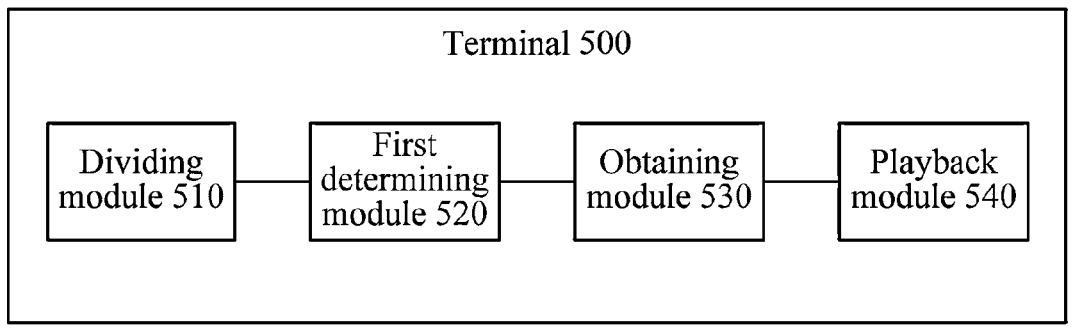
FIG. 13 is a schematic block diagram of a terminal according to an embodiment of the present disclosure.

FIG. 13 shows a schematic block diagram of a terminal 500 according to an embodiment of the present disclosure. As shown in FIG. 13, the terminal 500 includes:

a dividing module 510, configured to divide an original playback image into at least two regions of interest;

a first determining module 520, configured to determine, among the at least two regions of interest marked out by the dividing module 510, a first region of interest where a triggering event occurs;

an obtaining module 530, configured to obtain decoded data of a first video image displayed in the first region of interest determined by the first determining module 520; and a playback module 540, configured to render the decoded data of the first video image obtained by the obtaining module 530 to a specified playback window for playing.

Therefore, the video playback terminal according to the embodiment of the present disclosure divides an original playback image into multiple regions of interest, and separately displays an image in a region of interest where a triggering event occurs. Therefore, in one aspect, a user is capable of observing clearer image details in the region of interest, and in another aspect, the user is capable of tracking image details in the multiple regions of interest at the same time, thereby significantly improving user experience.

It should be understood that, in the embodiment of the present disclosure, the video playback terminal may not only play a video file, but also play a real-time video stream. The embodiment of the present disclosure is described based on the example that the terminal plays a real-time video stream, but the embodiment of the present disclosure is not limited thereto.

Figure 14:
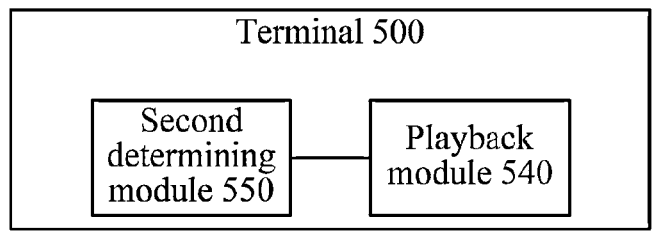
FIG. 14 is another schematic block diagram of a terminal according to an embodiment of the present disclosure.

In the embodiment of the present disclosure, optionally, as shown in FIG. 14, the terminal 500 further includes:

a second determining module 550, configured to determine correspondence between each region of interest among the at least two regions of interest and a specified playback window;

where the playback module 540 is further configured to: according to the correspondence determined by the second determining module 550, render the decoded data of the first video image obtained by the obtaining module 530 to a specified playback window corresponding to the first region of interest for playing.

In the embodiment of the present disclosure, optionally, the dividing module 510 is further configured to divide the original playback image into the at least two regions of interest in an equal division manner or a free division manner.

Figure 15:
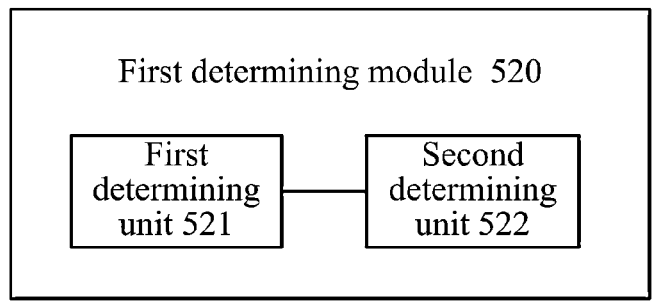
FIG. 15 is a schematic block diagram of a first determining module according to an embodiment of the present disclosure.

In the embodiment of the present disclosure, optionally, as shown in FIG. 15, the first determining module 520 includes:

a first determining unit 521, configured to determine a triggering operation performed by a user on a region of interest in the original playback image, where the triggering operation includes: a click operation, a double-click operation, or an operation of selecting a region of interest; and a second determining unit 522, configured to determine the region of interest within which the triggering operation determined by the first determining unit 521 is performed as the first region of interest.

Figure 16:
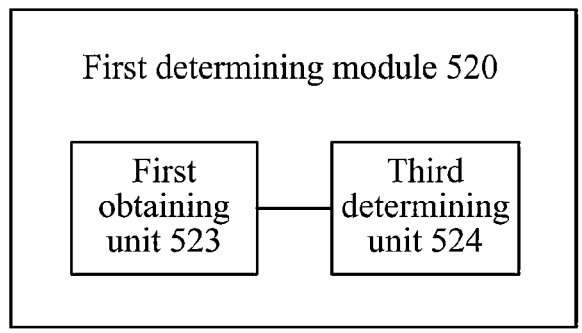
FIG. 16 is another schematic block diagram of a first determining module according to an embodiment of the present disclosure.

In the embodiment of the present disclosure, optionally, as shown in FIG. 16, the first determining module 520 includes:

a first obtaining unit 523, configured to obtain coordinate metadata of a triggering event occurrence point in the original playback image; and a third determining unit 524, configured to: determine the region of interest to which the triggering event occurrence point belongs as the first region of interest according to the coordinate metadata obtained by the first obtaining unit 523.

Figure 17:
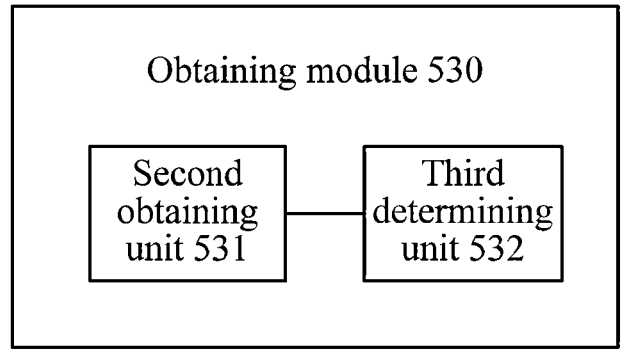
FIG. 17 is a schematic block diagram of an obtaining module according to an embodiment of the present disclosure.

In the embodiment of the present disclosure, optionally, as shown in FIG. 17, the obtaining module 530 includes:

a second obtaining unit 531, configured to obtain decoded data of the original playback image; and a third determining unit 532, configured to: determine the decoded data of the first video image according to the decoded data of the original playback image obtained by the second obtaining unit 531.

In the embodiment of the present disclosure, optionally, the playback module is further configured to render the decoded data of the first video image to the specified playback window for playing in a zoom-in manner, where the specified playback window is larger than the first region of interest.

Figure 18:
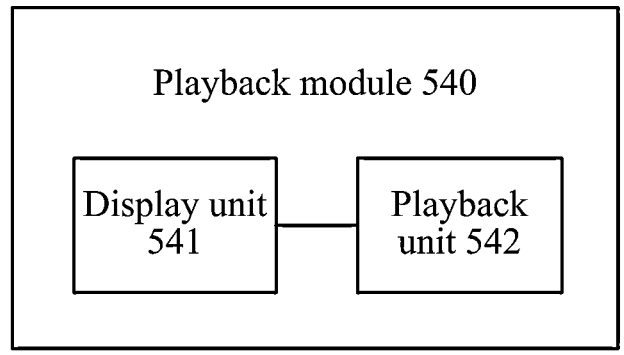
FIG. 18 is a schematic block diagram of a playback module according to an embodiment of the present disclosure.

In the embodiment of the present disclosure, optionally, as shown in FIG. 18, the playback module 540 includes:

a display unit 541, configured to display an independent playback window; and a playback unit 542, configured to render the decoded data of the first video image to the independent playback window displayed by the display unit for playing.

It should be understood that, the video playback terminal 500 according to the embodiment of the present disclosure may correspond to the video playback apparatus in the foregoing embodiments of the present disclosure, and the foregoing and other operations and/or functions of the modules in the terminal 500 are used for implementing corresponding processes of the methods 100 to 400 in FIG. 1 to FIG. 12B respectively, which are not repeated herein for the conciseness of the description.

Therefore, the video playback terminal according to the embodiment of the present disclosure divides an original playback image into multiple regions of interest, and separately displays an image in a region of interest where a triggering event occurs. Therefore, in one aspect, a user is capable of observing clearer image details in the region of interest, and in another aspect, the user is capable of tracking image details in the multiple regions of interest at the same time, thereby significantly improving user experience.

Figure 19:
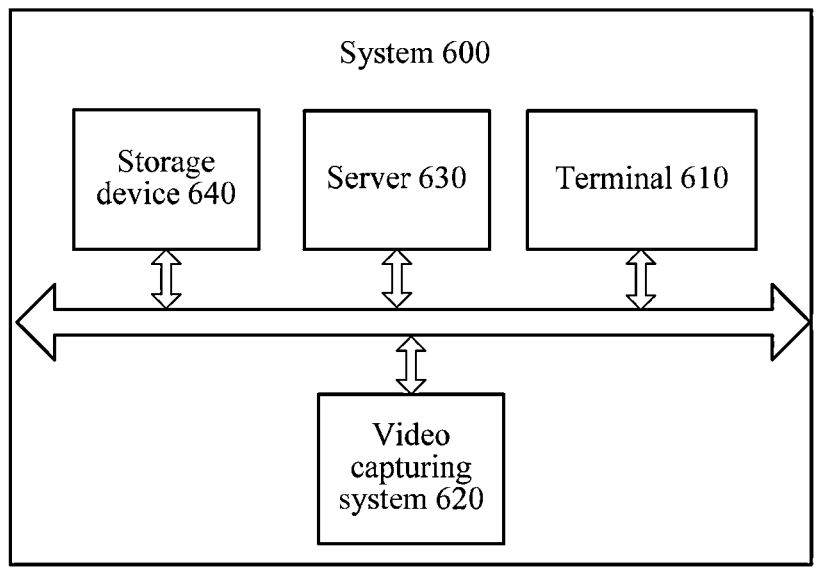
FIG. 19 is a schematic block diagram of a system according to an embodiment of the present disclosure.

FIG. 19 is a schematic block diagram of a system 600 according to an embodiment of the present disclosure. As shown in FIG. 19, the system 600 includes:

a terminal 610 according to the embodiment of the present disclosure;

a video capturing system 620, configured to capture a video image, and generate a media stream by encoding the video image;

a server 630, configured to obtain the media stream generated by the video capturing system, and provide the media stream for the terminal 620; and a storage device 640, configured to store the media stream obtained by the server 630.

It should be understood that, the terminal 610 included in the video playback system 600 according to the embodiment of the present disclosure may correspond to the video playback terminal 500 in the foregoing embodiments of the present disclosure, and the foregoing and other operations and/or functions of the modules in the terminal 610 are used for implementing corresponding processes of the methods 100 to 400 in FIG. 1 to FIG. 12B respectively, which are not repeated herein for the conciseness of the description.

Therefore, the video playback system according to the embodiment of the present disclosure divides an original playback image into multiple regions of interest, and separately displays an image in a region of interest where a triggering event occurs. Therefore, in one aspect, a user is capable of observing clearer image details in the region of interest, and in another aspect, the user is capable of tracking image details in the multiple regions of interest at the same time, thereby significantly improving user experience.

Figure 20:
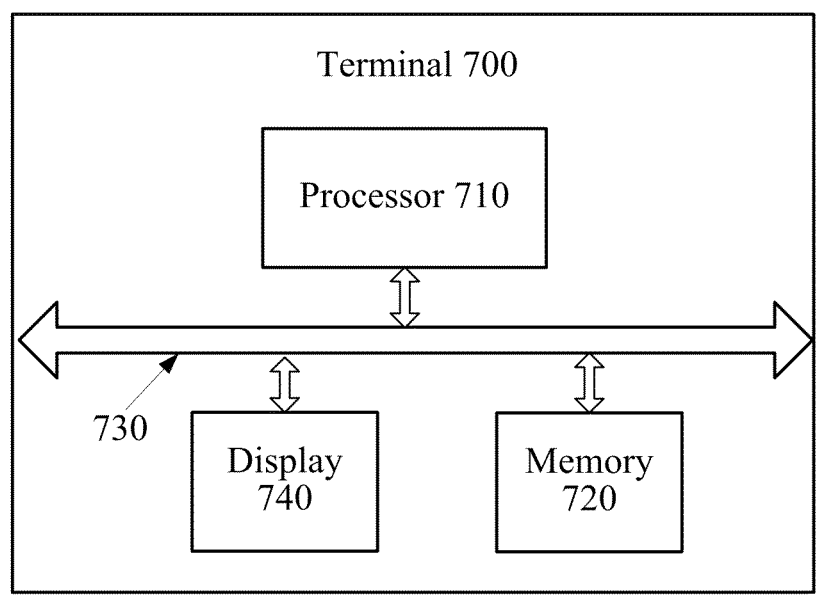
FIG. 20 is a schematic block diagram of a terminal according to another embodiment of the present disclosure.

An embodiment of the present disclosure further provides a video playback terminal. As shown in FIG. 20, the terminal 700 includes: a processor 710, a memory 720, and a bus system 730, where the processor 710 and the memory 720 are connected to each other through the bus system 730. The memory 720 is configured to store an instruction, and the processor 710 is configured to execute the instruction stored in the memory 720. The processor 710 is configured to: divide an original playback image into at least two regions of interest; determine, among the at least two regions of interest, a first region of interest where a triggering event occurs; obtain decoded data of a first video image displayed in the first region of interest; and render the decoded data of the first video image to a specified playback window for playing.

Therefore, the video playback terminal according to the embodiment of the present disclosure divides an original playback image into multiple regions of interest, and separately displays an image in a region of interest where a triggering event occurs. Therefore, in one aspect, a user is capable of observing clearer image details in the region of interest, and in another aspect, the user is capable of tracking image details in the multiple regions of interest at the same time, thereby significantly improving user experience.

It should be understood that, in the embodiment of the present disclosure, the processor 710 may be a central processing unit (Central Processing Unit, CPU for short), and the processor 710 may also be another general processor, a digital signal processor (DSP), an application-specific integrated circuit (ASIC), a field programmable gate array (FPGA), or another programmable logic device, independent gate or transistor logic device, independent hardware component, or the like. The general processor may be a microprocessor, or the processor may also be any common processor or the like.

The memory 720 may include a read-only memory and a random access memory, and provide an instruction and data to the processor 710. A part of the memory 720 may further include a non-volatile random access memory. For example, the memory 720 may further store device type information.

In addition to a data bus, the bus system 730 may further include a power bus, a control bus, a status signal bus, and the like. However, to make the description clear, all buses are marked as the bus system 730 in the figure.

During implementation, each step of the foregoing methods may be completed through an integrated logic circuit of hardware in the processor 710 or instructions in a software form. The steps with reference to the methods disclosed in the embodiments of the present disclosure may be directly embodied as being executed by a hardware processor or by a combination of hardware and software modules in the processor. The software module may be located in a mature storage medium in the art, such as a random access memory, a flash memory, the read-only memory, a programmable read-only memory, an electronically erasable programmable memory, and a register. The storage medium is located in the memory 720; the processor 710 reads information in the memory 720, and completes the steps of the methods in conjunction with the hardware thereof. To avoid repetition, details are not described again herein.

Optionally, as an embodiment, the processor 710 is further configured to determine correspondence between each region of interest among the at least two regions of interest and a specified playback window. That the processor 710 renders decoded data of a first video image to a specified playback window for playing includes: according to the correspondence, rendering the decoded data of the first video image to a specified playback window corresponding to the first region of interest for playing.

Optionally, as an embodiment, that the processor 710 divides the original playback image into at least two regions of interest includes: dividing the original playback image into the at least two regions of interest in an equal division manner or a free division manner.

Optionally, as an embodiment, that the processor 710 determines a first region of interest where a triggering event occurs among the at least two regions of interest includes: determining a triggering operation performed by a user on a region of interest in the original playback image, where the triggering operation includes a click operation, a double-click operation, or an operation of selecting a region of interest; and determining the region of interest within which the triggering operation is performed as the first region of interest.

Optionally, as an embodiment, that the processor 710 determines a first region of interest where a triggering event occurs among the at least two regions of interest includes: obtaining coordinate metadata of a triggering event occurrence point in the original playback image; and determining the region of interest to which the triggering event occurrence point belongs as the first region of interest according to the coordinate metadata.

Optionally, as an embodiment, that the processor 710 obtains decoded data of a first video image displayed in the first region of interest includes: obtaining the decoded data of an original playback image; and determining the decoded data of the first video image according to the decoded data of the original playback image.

Optionally, as an embodiment, the terminal 700 is further configured to render the decoded data of the first video image to the specified playback window for playing in a zoom-in manner, where the specified playback window is larger than the first region of interest.

Optionally, as an embodiment, the terminal 700 further includes a display 740. That the processor 710 renders the decoded data of the first video image to a specified playback window for playing includes: displaying an independent playback window; the display 740 is configured to render the decoded data of the first video image to the independent playback window for playing.

It should be understood that, the video playback terminal 700 according to the embodiment of the present disclosure may correspond to the video playback terminal 500 or terminal 610 in the foregoing embodiments of the present disclosure, and the foregoing and other operations and/or functions of the modules in the terminal 700 are used for implementing corresponding processes of the methods 100 to 400 in FIG. 1 to FIG. 12B respectively, which are not repeated herein for the conciseness of the description.

Therefore, the video playback terminal according to the embodiment of the present disclosure divides an original playback image into multiple regions of interest, and separately displays an image in a region of interest where a triggering event occurs. Therefore, in one aspect, a user is capable of observing clearer image details in the region of interest, and in another aspect, the user is capable of tracking image details in the multiple regions of interest at the same time, thereby significantly improving user experience.

A person of ordinary skill in the art may be aware that, in combination with the examples described in the embodiments disclosed in this specification, units and algorithm steps may be implemented by electronic hardware, computer software, or a combination thereof. In order to clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It can be clearly understood by a person skilled in the art that, for the purpose of convenient and brief description, for a detailed working process of the foregoing systems, apparatuses, and units, reference may be made to a corresponding process in the method embodiments, and details are not described herein again.

In the several embodiments provided in the present application, it should be understood that the disclosed systems, apparatuses, and methods may be implemented in other manners. For example, the described apparatus embodiments are merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units herein may be selected according to an actual need to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in the embodiments of the present disclosure. The foregoing storage medium includes: any mediums capable of storing program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present disclosure, but are not intended to limit the protection scope of the present disclosure. Any equivalent modification or replacement readily figured out by a person skilled in the art within the technical scope of the present disclosure shall fall within the protection scope of the present disclosure. Therefore, the protection scope of the present disclosure shall be subject to the protection scope of the claims.

What is claimed is:

1. A video playback method, comprising:
    dividing an original playback image into at least two regions of interest;
    determining, among the at least two regions of interest, a first region of interest where a triggering event occurs;
    obtaining decoded data of a first video image displayed in the first region of interest; and
    rendering the decoded data of the first video image to a specified playback window.

2. The method according to claim 1, further comprising:
    determining a correspondence between each region of interest among the at least two regions of interest and a specified playback window;
    wherein the rendering the decoded data of the first video image to a specified playback window comprises:
    according to the correspondence, rendering the decoded data of the first video image to a specified playback window corresponding to the first region of interest.

3. The method according to claim 1, wherein the determining, among the at least two regions of interest, a first region of interest where a triggering event occurs comprises:
    determining a triggering operation performed by a user on a region of interest in the original playback image, wherein the triggering operation comprises: a click operation, a double-click operation, or an operation of selecting a region of interest; and
    determining the region of interest within which the triggering operation is performed as the first region of interest.

4. The method according to claim 1, wherein the determining, among the at least two regions of interest, a first region of interest where a triggering event occurs comprises:
    obtaining coordinate metadata of a triggering event occurrence point in the original playback image; and
    determining the region of interest to which the triggering event occurrence point belongs as the first region of interest according to the coordinate metadata.

5. The method according to claim 1, wherein the obtaining decoded data of a first video image displayed in the first region of interest comprises:
    obtaining decoded data of the original playback image; and
    determining the decoded data of the first video image according to the decoded data of the original playback image.

6. The method according to claim 1, wherein the rendering the decoded data of the first video image to a specified playback window comprises:
    rendering the decoded data of the first video image to the specified playback window in a zoom-in manner, wherein the specified playback window is larger than the first region of interest.

7. The method according to claim 1, wherein the rendering the decoded data of the first video image to a specified playback window comprises:
displaying an independent playback window; and
rendering the decoded data of the first video image to the independent playback window.

8. A video playback terminal, comprising:
a dividing module, configured to divide an original playback image into at least two regions of interest;
a first determining module, configured to determine, among the at least two regions of interest, a first region of interest where a triggering event occurs;
an obtaining module, configured to obtain decoded data of a first video image displayed in the first region of interest determined by the first determining module; and
a playback module, configured to render the decoded data of the first video image obtained by the obtaining module to a specified playback window.

9. The terminal according to claim 8, further comprising:
a second determining module, configured to determine a correspondence between each region of interest among the at least two regions of interest and a specified playback window;
wherein the playback module is further configured to:
according to the correspondence determined by the second determining module, render the decoded data of the first video image obtained by the obtaining module to a specified playback window corresponding to the first region of interest.

10. The terminal according to claim 8, wherein the first determining module comprises:
a first determining unit, configured to determine a triggering operation performed by a user on a region of interest in the original playback image, wherein the triggering operation comprises: a click operation, a double-click operation, or an operation of selecting a region of interest; and
a second determining unit, configured to determine the region of interest within which the triggering operation determined by the first determining unit is performed as the first region of interest.

11. The terminal according to claim 8, wherein the first determining module comprises:
a first obtaining unit, configured to obtain coordinate metadata of a triggering event occurrence point in the original playback image; and
a third determining unit, configured to determine the region of interest to which the triggering event occurrence point belongs as the first region of interest according to the coordinate metadata obtained by the first obtaining unit.

12. The terminal according to claim 8, wherein the obtaining module comprises:
a second obtaining unit, configured to obtain decoded data of the original playback image; and
a third determining unit, configured to determine the decoded data of the first video image according to the decoded data of the original playback image obtained by the second obtaining unit.

13. The terminal according to claim 8, wherein the playback module is further configured to render the decoded data of the first video image to the specified playback window for playing in a zoom-in manner, wherein the specified playback window is larger than the first region of interest.

14. The terminal according to claim 8, wherein the playback module comprises:
a display unit, configured to display an independent playback window; and
a playback unit, configured to render the decoded data of the first video image to the independent playback window displayed by the display unit.

15. A video playback system, comprising:
a video playback terminal;
a video capturing system, configured to capture a video image, and generate a media stream by encoding the video image;
a server, configured to obtain the media stream generated by the video capturing system, and provide the media stream to the terminal; and
a storage device, configured to store the media stream obtained by the server;
wherein the video playback terminal comprises:
a dividing module, configured to divide the video image into at least two regions of interest;
a first determining module, configured to determine, among the at least two regions of interest divided by the dividing module, a first region of interest where a triggering event occurs;
an obtaining module, configured to obtain decoded data of a first image displayed in the first region of interest determined by the first determining module; and
a playback module, configured to render the decoded data of the first image obtained by the obtaining module to a specified playback window.

* * * * *